(12) United States Patent
Mihalcea

(10) Patent No.: US 8,650,503 B2
(45) Date of Patent: Feb. 11, 2014

(54) USER INTERFACE CONSTRUCTION WITH MOCKUP IMAGES

(75) Inventor: Bogdan Mihalcea, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 12/499,108

(22) Filed: Jul. 8, 2009

(65) Prior Publication Data

US 2011/0010645 A1 Jan. 13, 2011

(51) Int. Cl.
*G06F 3/048* (2013.01)

(52) U.S. Cl.
USPC ........... 715/790; 715/711; 715/715; 715/791; 715/794; 715/797; 715/802; 715/854

(58) Field of Classification Search
USPC .................. 715/711, 715, 790, 791, 802, 854
See application file for complete search history.

(56) References Cited

U.S. PATENT DOCUMENTS

| | | | |
|---|---|---|---|
| 6,317,128 B1 | 11/2001 | Harrison et al. | |
| 6,587,118 B1 * | 7/2003 | Yoneda | 345/629 |
| 7,505,049 B2 * | 3/2009 | Engel | 345/629 |
| 7,724,208 B1 * | 5/2010 | Engel et al. | 345/4 |
| 7,730,413 B1 * | 6/2010 | Engel et al. | 715/764 |
| 8,120,547 B2 * | 2/2012 | Seymour | 345/4 |
| 8,146,277 B2 * | 4/2012 | Engel | 40/453 |
| 8,154,473 B2 * | 4/2012 | Engel et al. | 345/4 |
| 8,352,879 B2 * | 1/2013 | Leung et al. | 715/799 |
| 2003/0043192 A1 | 3/2003 | Bouleau | |
| 2008/0010074 A1 | 1/2008 | Brunswig et al. | |
| 2008/0034314 A1 | 2/2008 | Louch et al. | |
| 2008/0307342 A1 | 12/2008 | Furches et al. | |
| 2009/0089660 A1 * | 4/2009 | Atkins et al. | 715/243 |

OTHER PUBLICATIONS

"Testimonials", "DesignerVista", Retrieved at <<http://www.designervista.com/testimonials.html>>, Apr. 24, 2009, pp. 1-2.
"Visualize your GUI Design Ideas as Wireframe Mockups!", Retrieved at <<http://www.mockupscreens.com/index.php?page=Visualize_GUI_Design_Ideas>>, Sep. 22, 2006, pp. 1-2.
"Paint.net", Retrieved at <<http://www.co.henderson.k12.nc.us/Teachers/it-web/Elementary_Software/paint.net.pdf>>, listed as last modified Oct. 27, 2008, pp. 23.

* cited by examiner

*Primary Examiner* — David Phantana Angkool
(74) *Attorney, Agent, or Firm* — Kevin Sullivan; Kate Drakos; Micky Minhas

(57) ABSTRACT

A mockup image can be received at a user interface designer module and a representation of the mockup image can be overlaid with a representation of a user interface that is under construction. One or more visual features of the user interface and one or more visual features of the mockup image can be matched. Also, one or more guides can be matched to one or more features in a mockup image, and one or more features of a user interface that is under construction can be automatically matched to the one or more guides.

20 Claims, 9 Drawing Sheets

USER INTERFACE CONSTRUCTION WITH MOCKUP IMAGES

BACKGROUND

Most computer user interface display concepts are created by artists using image drawing or design applications, such as Microsoft Visio® or Adobe Photoshop®. The resulting concepts are typically passed on to software developers as digital mockup images, such as JPEG files, bitmap files, etc. The developers typically use the concepts to create actual user interfaces using user interface designers, such as Microsoft's Visual Studio®. As used herein, a user interface is code that can produce a visual display of a type that can allow interaction with a user, such as a Web page, a dialog, etc. User interfaces typically include features, such as links, buttons, etc., that facilitate such interaction. Developers typically try to produce an actual user interface that is as close to the concept as possible by comparing the user interface designer's representation of the user interface to a representation of the mockup image in the form of a paper printout or an on-screen display that is separate from the user interface representation.

SUMMARY

Whatever the advantages of previous user interface construction tools and techniques, they have neither recognized the user interface construction tools and techniques described and claimed herein, nor the advantages produced by such tools and techniques. In embodiments of the tools and techniques described herein a mockup image representation can be overlaid with a user interface representation. Overlaying the representations includes representing the representations in a common space (e.g., a common coordinate system, a common computer display area, etc.). The resulting overlay can allow visual features of the user interface to be modified to match visual features of the mockup image. The overlay may include a mockup image representation being overlaid over a user interface representation or the user interface representation being overlaid over the mockup image representation.

In one embodiment, the tools and techniques can include receiving a mockup image at a user interface designer module and overlaying a representation of the mockup image with a representation of a user interface that is under construction. Overlaying can include overlaying the mockup image representation over the user interface representation or overlaying the user interface representation over the mockup image representation. One or more visual features of the user interface and one or more visual features of the mockup image can be matched.

In another embodiment of the tools and techniques, a representation of a user interface that is under construction can be displayed in a display area. A mockup image representation can also be displayed in the display area. The mockup image representation and the user interface representation can be blended so that the mockup image representation and the user interface representation are visible in the display area. User input that is directed at a feature of the user interface representation can be received, and a feature of the user interface that corresponds to the feature of the user interface representation can be modified in response to receiving the user input.

In yet another embodiment of the tools and techniques, guides can be matched to features in a mockup image. Features of a user interface that is under construction can be automatically matched to the guides.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
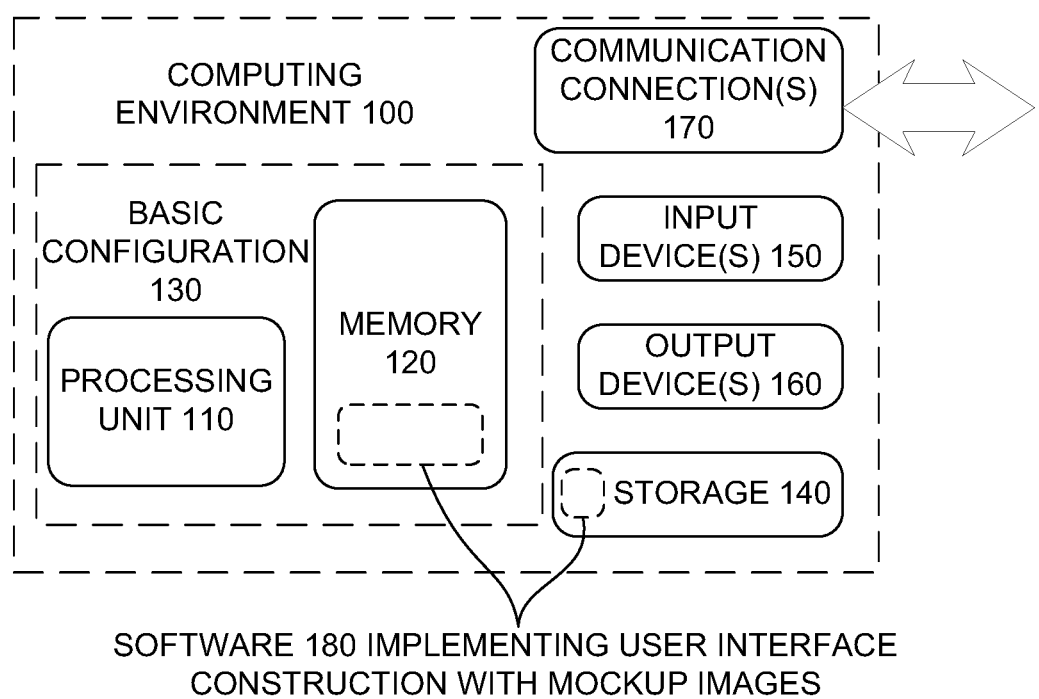
FIG. 1 is a block diagram of a suitable computing environment in which one or more of the described embodiments may be implemented.

Described embodiments are directed to techniques and tools for improved construction of user interfaces from mockup images. Such improvements may result from the use of various techniques and tools separately or in combination.

Such techniques and tools may include overlaying a mockup image representation and a user interface representation of a user interface under construction. As noted above, overlaying the representations includes representing the representations in a common space (e.g., a common coordinate system, a common computer display area, etc.). For example, the image may be automatically analyzed, and a user interface may be automatically generated, with one or more features of the user interface being automatically matched to the mockup image. For example, this matching can be done by comparing positional coordinates of user interface and mockup image features in a common coordinate system where the user interface representation and the mockup image representation have been overlaid. Overlaying may or may not include displaying the overlaid representations on a computer display.

As another example, overlaying can include displaying an overlay that includes a representation of a user interface and a representation of a mockup image being blended. With the user interface representation and the mockup image being blended, a user can easily see whether features of the user interface representation are out of alignment with the mockup image. Accordingly, the user can provide user input to add, modify, and/or delete features of the user interface to match the user interface features (as shown by the user interface representation) with the mockup image. Moreover, the techniques and tools may include snapping the user interface features to guides corresponding to features in the mockup image. For example, this snapping can be done in response to user input that moves the corresponding features toward the guides.

In existing user interface creation techniques, user interface representations are compared to either on-screen images that are separate from the user interface representations, or paper printouts. With these existing techniques, it can be a difficult and time consuming task to make an application with a complex user interface look alike across multiple user interface elements and to follow an artistic concept or template, especially if fine accuracy, such as one-pixel accuracy is desired. The tools and techniques described herein can make the creation and fine tuning of user interfaces (dialogs, HTML web pages, etc.) easier and more efficient.

Accordingly, one or more substantial benefits can be realized from the tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as a computing environment for generating and modifying user interfaces. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing user interface construction with mockup images.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available storage media that can be accessed within a computing environment. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "modify," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. User Interface and Mockup Image Overlay System and Environment

Figure 2:
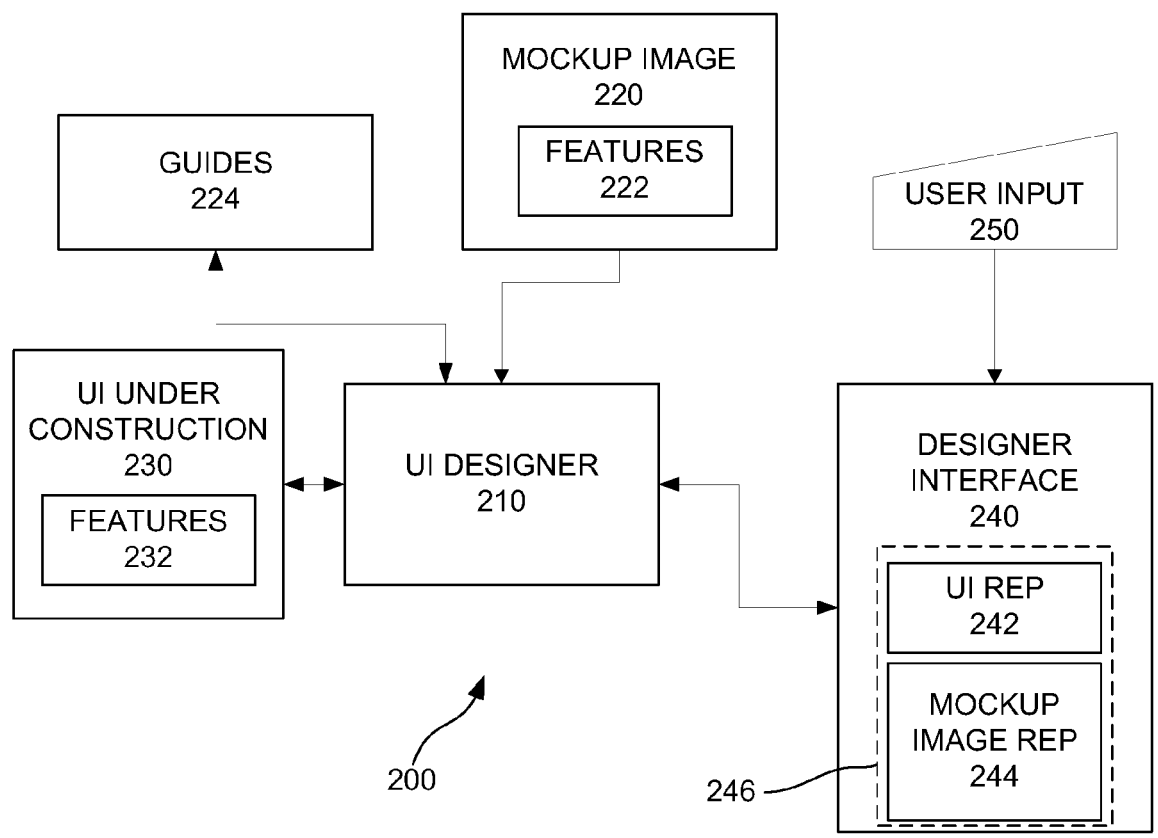
FIG. 2 is a block diagram of user interface and mockup image overlay environment.

FIG. 2 is a block diagram of a user interface and mockup image overlay environment (200) in conjunction with which one or more of the described embodiments may be implemented. The environment (200) can include a user interface designer module or user interface designer (210). The user interface designer (210) may be any of a variety of different modules that facilitate the design of user interfaces, such as dialogs, markup language pages such as hypertext markup language pages (e.g., hypertext markup language pages), etc. For example, the user interface designer may be Microsoft's Expression® design software or Microsoft's Visual Studio® development system resource editor, HTML editor, or Windows® forms editor. The user interface designer (210) can receive a mockup image (220) having features (222), such as visual features representing lines, colors, action buttons, text, overall size and shape, etc. The mockup image (220) can be an image of how a user interface is intended to look. For example, the image may be an image created by an artist. The image may be in any of many different forms, such as a JPEG, TIFF, PNG, bitmap, or PDF file. Such images can be created by a variety of different graphics programs, such as Adobe's Photoshop® graphics editing software or Microsoft's Visio® drawing and diagramming software.

The user interface designer (210) may analyze the mockup image (220) and create guides (224) that correspond to the visual features (222) of the mockup image (220). To facilitate the creation of the guides (224), the image (220) may be created with particular colors that signal the user interface designer (210) that the colors correspond to particular features (222) (e.g., buttons may be outlined in a particular color of red). Alternatively, the colors of the mockup image (220) may serve as the guides (224) without the user interface designer (210) creating separate guides (224). The user interface designer (210) can generate and modify a user interface (230) that is under construction. The user interface (230) is the code that will be used to generate the actual display of the user interface, such as the dialog, the web page, etc. For example, the user interface (230) may include the actual hypertext markup language code for a hypertext markup language page, or preliminary code that will be translated or compiled into the actual hypertext markup language code. The user interface (230) can include a variety of features (232), such as active button features, passive or linking text features, passive or linking graphical features, or combinations of these.

The user interface designer (210) can overlay a representation of the mockup image (220) and a representation of the user interface (230), and can match the locations (which can include sizes and shapes) of the user interface features (232) to the locations of the mockup image features (222). For example, the user interface designer may automatically generate the user interface (230) and match the locations of one or more of the features (232) of the user interface (230) to one or more of the features (222) of the mockup image (220) using the guides (224). Even if the user interface designer (210) does not automatically generate the user interface (230), the user interface designer may still automatically match the locations of one or more of the user interface features (232) and one or more of the mockup image features (222). As an example, the locations may be matched by mapping the guides (224) or some other representation of one or more features of the mockup image (220) and a representation of one or more features of the user interface (230) to a common space, such as a common coordinate system. With the representations mapped to the common space, the location coordinates corresponding to the features (232) of the user interface (230) can be automatically modified to match the location coordinates corresponding to the features (222) of the mockup image (220).

As an alternative to, or in addition to, such automatic matching, the user interface designer can assist a user in matching the locations of the user interface features (232) and the mockup image features (222). For example, the user interface designer (210) can also provide a designer interface (240), which can be displayed on a computer display. The designer interface can include a user interface representation (242), which can include displayed features that visually represent the visual features (232) of the user interface (230) under construction. Moreover, the designer can include a mockup image representation (244), which can include displayed features that visually represent the visual features (222) of the mockup image (220). The user interface representation (242) and the mockup image representation (244) can be overlaid in a display area (246), such as by blending the displays of the user interface representation (242) and the mockup image representation (244). For example, the mockup image representation (244) can be displayed as a semi-transparent image over the user interface representation (242). Alternatively, the user interface representation (242) can be displayed as a semi-transparent image over the mockup image representation (244).

The semi-transparent overlay of the user interface representation (242) and the mockup image representation (244) can be implemented in various ways. For example, the semi-transparent image can be painted as an alpha-blended image directly inside the opaque dialog's device context (e.g., the mockup image representation (244) can be painted as a semi-transparent image in the device context of a dialog of the user interface representation (242)). In this example, the blending can occur at the end of the dialog's paint event, after the frame, background and controls are already painted. Each time there is a paint event happening in any of the opaque dialog's elements (frame, background, children controls, etc.) the semi-transparent image can be repainted/re-blended inside the opaque dialog's device context. The semi-transparent image can be painted and blended by converting the image that is to be displayed semi-transparently to a bitmap file if it is not already a bitmap file, and calling the Windows® GDI application programming interface "AlphaBlend", which can have the following syntax:

```
BOOL AlphaBlend(
    _in HDC hdcDest, // Handle to the destination device context.
    _in int xoriginDest, // Specifies the x-coordinate, in logical units,
of the upper-left corner of the destination rectangle.
    _in int yoriginDest, // Specifies the y-coordinate, in logical units,
of the upper-left corner of the destination rectangle.
    _in int wDest, // Specifies the width, in logical units, of the
destination rectangle.
    _in int hDest, // Specifies the height, in logical units, of the
destination rectangle.
    _in HDC hdcSrc, // Handle to the source device context.
    _in int xoriginSrc, // Specifies the x-coordinate, in logical units,
of the upper-left corner of the source rectangle.
    _in int yoriginSrc, // Specifies the y-coordinate, in logical units,
of the upper-left corner of the source rectangle.
    _in int wSrc, // Specifies the width, in logical units, of the source
rectangle.
    _in int hSrc, // Specifies the height, in logical units, of the source
rectangle.
    _in BLENDFUNCTION ftn // Specifies the alpha-blending function
for source and destination bitmaps, a global alpha value to be applied to
the entire source bitmap, and format information for the source bitmap.
);
```

As another example of implementing a semi-transparent overlay, the semi-transparent image can be displayed in a shadow dialog, which can be kept on top of the dialog displaying the opaque image. For example, the shadow dialog can be semi-transparent and it can include a representation of the semi-transparent image (such as the mockup image). The shadow dialog can be made aware of the position and paint state of the opaque dialog so that the shadow dialog can be kept on top of the opaque dialog. The semitransparent dialog can be made semitransparent (and can be made to allow events such as mouse clicks to pass through the semitransparent dialog to the opaque dialog below it) by calling the Microsoft MFC library reference "CWnd::ModifyStyleEx," as in the following example:

```
// This example would make the dialog box transparent by changing
the dialog window's extended styles.
    int CMyDialog::OnCreate(LPCREATESTRUCT lpCreateStruct)
    {
        if (CDialog::OnCreate(lpCreateStruct) == -1)
            return -1;
        ModifyStyleEx(0, WS_EX_TRANSPARENT);
        return 0;
    }
```

User input (250) can be directed to the designer interface (240). For example, the user input (250) can be directed to features of the user interface representation (242) in the display area (246). For example, the user input (250) can include input from a keyboard, mouse, touch pad, touch screen, track ball, and/or some other input device that is intended to move a feature (232) of the user interface (230) toward a corresponding feature (222) of the mockup image (220), such as by dragging and dropping a corresponding feature of the user interface representation (242) toward a corresponding feature of the mockup image representation (244). The designer interface (240) may implement features to assist in accurate matching of locations of user interface features (232) and mockup image features (222), such as snap and/or glue operations that are often used in graphical programs such as Microsoft's Visio® drawing and diagramming software. For example, as a user provides input to drag a user interface feature (232) toward a corresponding mockup image feature (222), the user interface designer (210) can automatically snap the user interface feature (232) to match the location (which can include the size and/or shape) of the mockup image feature (222).

Figure 3:
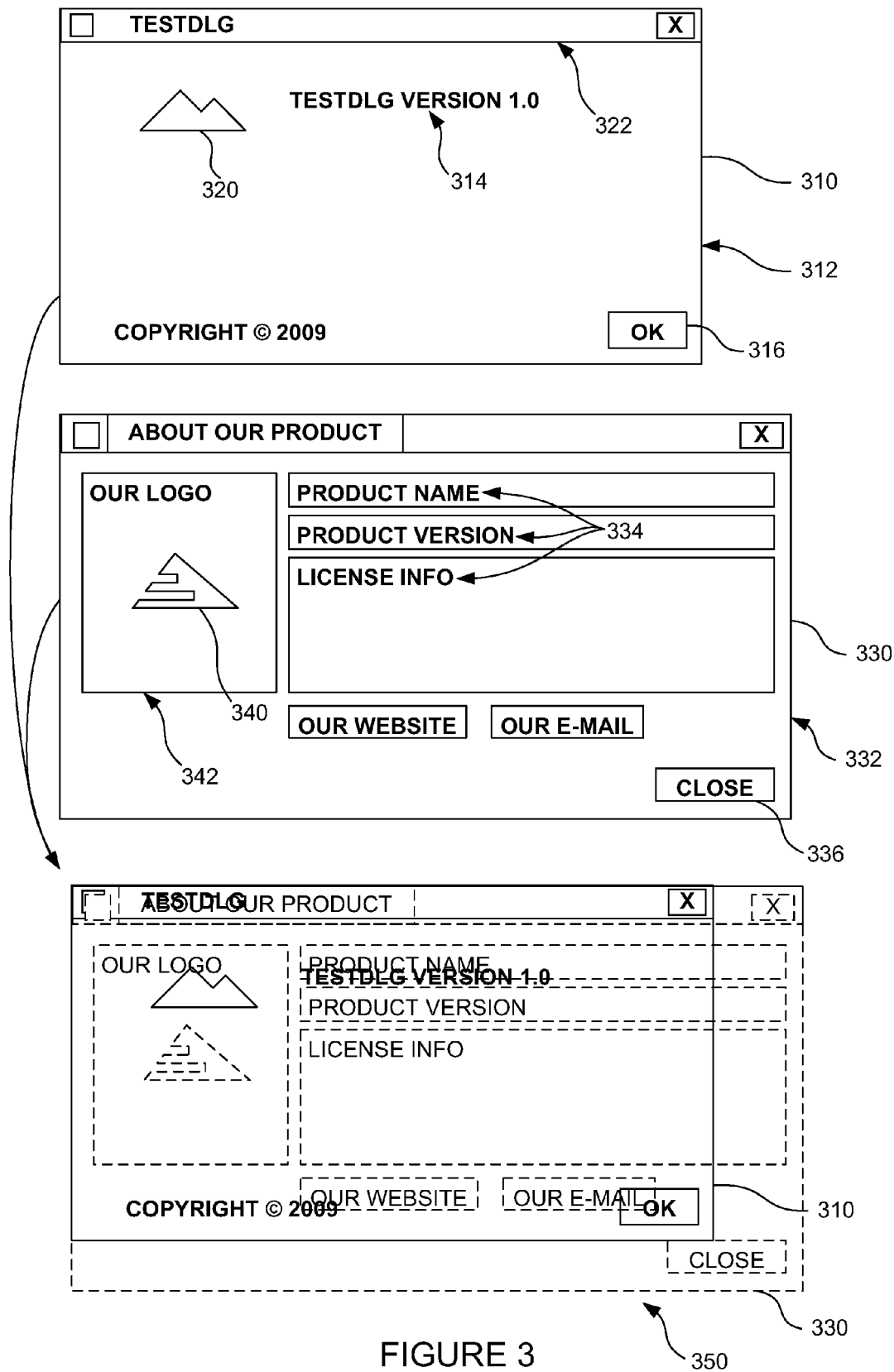
FIG. 3 is a schematic diagram of a user interface representation being overlaid with a mockup image representation to form a displayed overlay.

Referring now to FIG. 3, some examples of displayed overlays of user interface representations and mockup image representations will be discussed, where the represented user interfaces are dialogs. In other examples, the user interfaces may be other types of user interfaces, such as markup language pages, overall visual environments for applications, etc. A user interface that is under construction can be formed as a default test dialog without initially being matched to a mockup image, and the dialog can be represented by a user interface representation (310), which can be a display of the dialog on a computer display. The user interface representation (310) can include visual features, such as edges (312) of the dialog, static text (314), buttons (316), designs (320), and interior lines (322). The user interface representation (310) can also include other types of visual features.

A mockup image can be used to represent a visual concept to which the test dialog is to be matched to form a form a final dialog, such as a dialog for inclusion with a computer application being developed. A representation (330) of the mockup image can be displayed on a computer display, and can include visual features that are similar to those of the test dialog. For example, the mockup image representation (330) can include dialog edges (332), static text (334), buttons (336), designs (340), and interior lines (342), among other features.

As is illustrated at the bottom of FIG. 3, the user interface representation (310) can be overlaid with the mockup image representation (330) to form an overlay (350), which can be presented in a display area of a computer display with the representations (310, 330) being blended. For example, the mockup image representation (330) can be displayed as a semi-transparent image (as illustrated by dashed lines and non-bolded text in FIGS. 3-5) over the user interface representation (310), which can be displayed as an opaque image. This can be done using standard image display blending techniques, such as by using the existing application programming interfaces discussed above, which are available to developers of applications for the Windows® operating system. This can allow a dialog developer to see where modifications can be made to features of the user interface representation (310) to match the locations (including size, etc.) of those features to the features of the mockup image representation (330), and thereby modify the underlying user interface dialog to match the mockup image.

Figure 4:
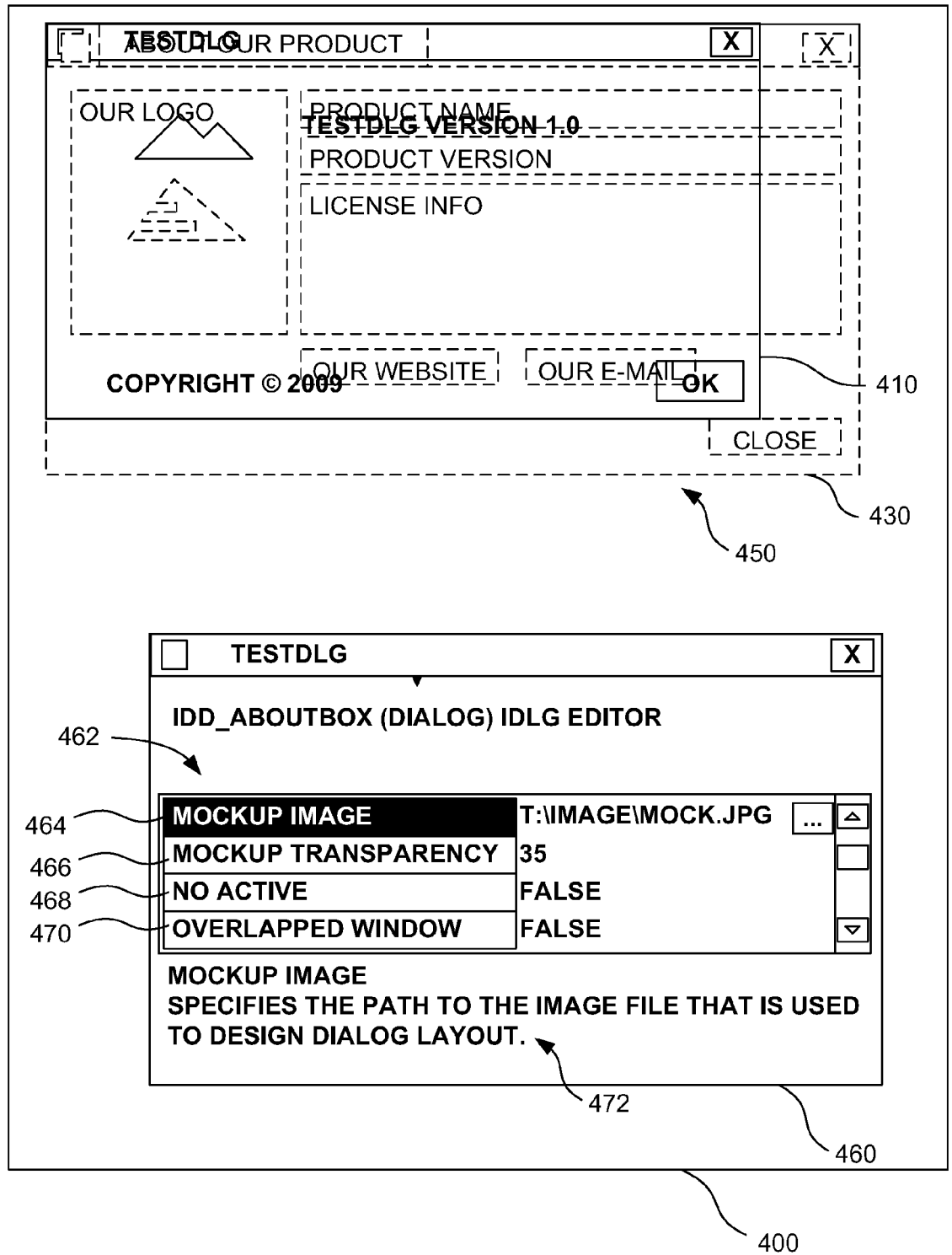
FIG. 4 is a diagram illustrating a representation of a user interface designer interface.

Referring to FIG. 4, a representation (400) of a user interface designer interface is illustrated. The designer interface representation (400) can include a user interface representation (410) and a mockup image representation (430) in an overlay (450), as discussed above. In addition, the designer interface representation (400) can include other features to assist in constructing user interfaces, such as a properties dialog representation (460), which can include a list (462) of properties of the designer interface that can be modified in response to user input. For example, the list (462) can include a mockup image list item (464), where a path to a mockup image to be represented in the designer interface representation (400) can be specified. In addition, a mockup transparency list item (466) can specify a transparency value for the mockup image representation (430). The list (462) can also include other items, such as a "no active" list item (468) and an "overlapped window" list item (470). The "overlapped window" list item (470) can specify whether an overlay is implemented by painting a user interface representation and a mockup image representation inside a single user interface space (such as a single dialog), or the overlay is implemented by painting the representations in two interface spaces, such as a main dialog and a shadow dialog. The list (462) can include other items in addition to or instead of the list items illustrated in FIG. 4. For example, the list (462) can include a "move mockup to background" list item along with a value of true or false, which can specify whether the mockup image representation is displayed over the user interface representation (in the foreground) or under the user interface representation (in the background). The properties dialog representation (460) can also include an explanation (472) of a highlighted list item. User input can modify the values of the list items (464, 466, 468, 470) in standard ways, such as by directing input at the target areas of the list items (464, 466, 468, 470) to modify the values of the list items (464, 466, 468, 470). For example, the input can include mouse clicks on the list items (464, 466, 468, 470), followed by selections from menus or dialogs, or entering values using a keyboard.

Moreover, features of the user interface representation (410) can be modified (created, moved, resized, deleted, etc.) to match the features of the mockup image representation (430). This can be done in standard ways, such as by dragging and dropping buttons, lines, designs, etc., or entering text with keyboard entries or cut-and-paste techniques. The modifications can be assisted using automated or semi-automated techniques, such as snap-and-glue techniques, where features of the user interface representation (410) can snap to features of the mockup image representation (430), such as by using guides to which the features can snap. Such modifications can result in modifications to the user interface that is represented by the user interface representation (410), so that the user interface can match the mockup image that is represented by the mockup image representation (430).

Figure 5:
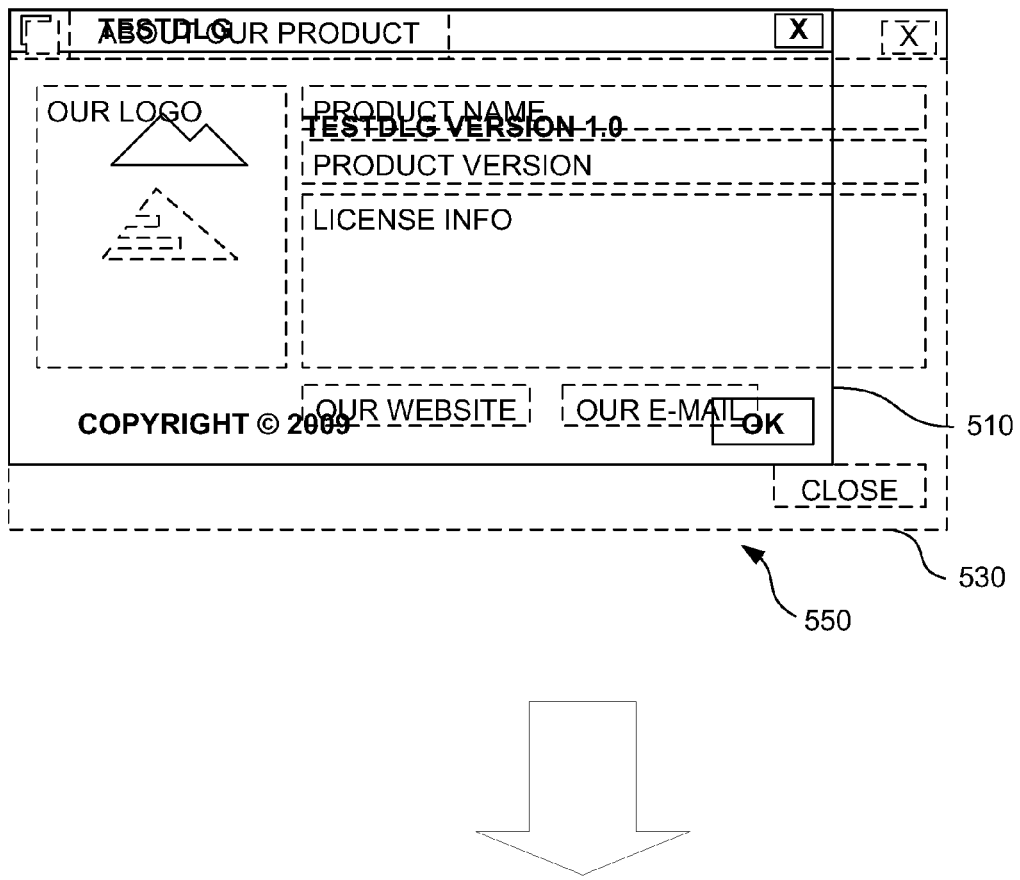
FIG. 5 is a schematic diagram illustrating modifications to a user interface that is represented by a user interface representation, so that the user interface can match a mockup image that is represented by a mockup image representation.
Figure 5:
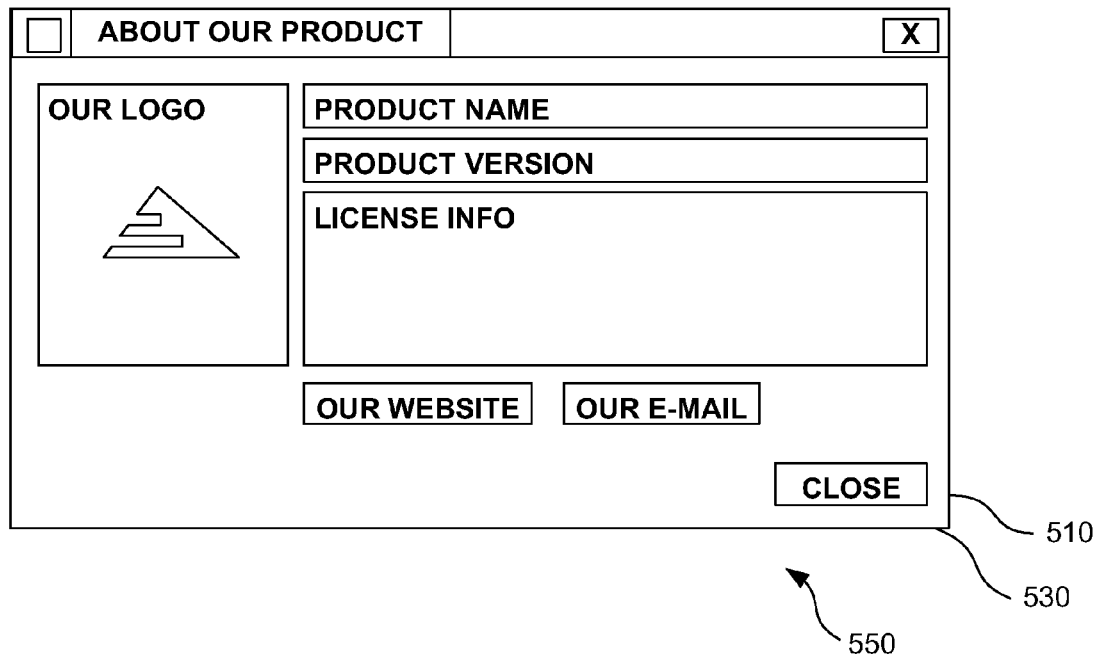

Referring now to FIG. 5, such modifications are illustrated. At the top of FIG. 5, a user interface representation (510) and a mockup image representation (530) are illustrated in an overlay (550). As can be seen, the user interface representation (510) does not match the mockup image representation (530) at the top of FIG. 5. However, the locations of features of the user interface representation (510) can be modified to match the locations of features of the mockup image representation (530), as illustrated by the overlay (550) at the bottom of FIG. 5. For example, the modifications can include deleting features (e.g., "COPYRIGHT© 2009" text), adding or creating features (e.g., "OUR WEBSITE" and "OUR EMAIL" buttons), moving features (e.g., moving the edges of the user interface representation (510), moving the "OK" button to match the "CLOSE" button), resizing features (e.g., resizing the "OK" button to match the size of the "CLOSE" button), and/or modifying text and/or designs (e.g., in the "OK" button, replacing "OK" with "CLOSE").

III. Mockup Image and User Interface Overlay Techniques

Mockup image and user interface overlay techniques will now be discussed. These techniques may be done with the systems and environments discussed above, or with some other computing system and/or environment.

Figure 6:
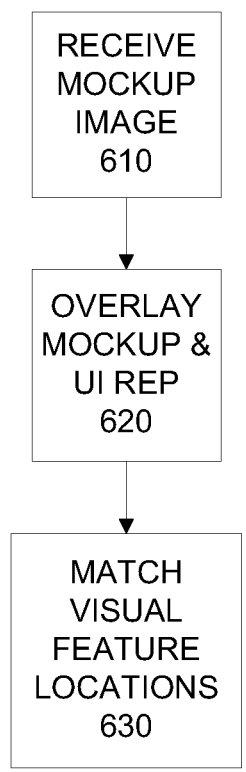
FIG. 6 is a flow diagram of a user interface construction technique.

Referring to FIG. 6, a mockup image and user interface overlay technique will be discussed. In the technique, a mockup image can be received (610) at a user interface designer module. A representation of the mockup image can be overlaid (620) with a representation of a user interface that is under construction in the user interface designer module. The user interface can be any of many different types of user interfaces, such as a dialog or a markup language page (e.g., a hypertext markup language page). Overlaying can include mapping representations of the mockup image and the user interface in a common space, such as a common coordinate system or a common computer display, so that locations of features of the representations can be compared in that common space. Overlaying (620) can include displaying a designer interface of the user interface designer module on a computer display. The designer interface can include the user interface representation displayed in a display area, as well as the mockup image representation displayed semi-transparently over the user interface representation. Overlaying can include blending the user interface representation and the mockup image representation on a computer display.

In addition, locations of one or more visual features of the user interface can be matched (630) to one or more visual features of the mockup image. Matching (630) can include receiving user input directed at the display area from a user input device (such as user input directed at one or more features of the user interface representation), as well as modifying the user interface and the user interface representation in response to the user input. If the mockup image representation is displayed over the user input representation, the user input can be passed through the mockup image representation to the user input representation. Matching (630) may include automatically matching one or more visual features of the user interface and one or more visual features of the mockup image in the common coordinate system, which may include snapping one or more features of the user interface to one or more features of the mockup image.

Figure 7:
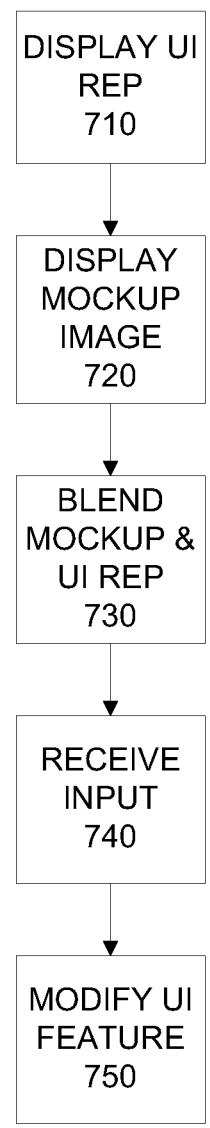
FIG. 7 is a flow diagram of another user interface construction technique.

Referring now to FIG. 7, another mockup image and user interface overlay technique will be described. In the technique, a representation of a user interface that is under construction (such as a dialog, markup language page, etc.) can be displayed (710), and a mockup image representation can also be displayed (720). The mockup image representation and the user interface representation can both be displayed (710 and 720) in one display area, and the representations can be blended (730) so that both are visible in the display area. For example, blending (730) can include displaying the mockup image representation as a semitransparent image over the user interface representation. User input directed at a feature of the user interface representation can be received (740), and in response, a feature of the user interface that corresponds to the feature of the user interface representation can be modified (750). For example, the feature may be one or more edges of the user interface, and the feature may be modified by resizing the user interface. The user interface representation may also be modified in response to the user input. The user input may be passed through the mockup image representation to the user interface representation.

Figure 8:
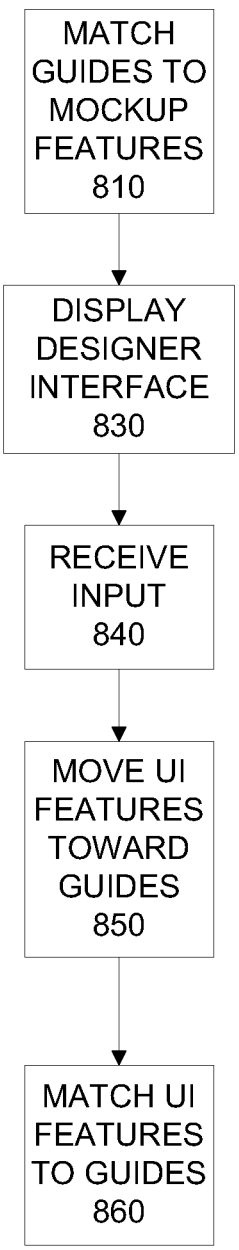
FIG. 8 is a flow diagram of yet another user interface construction technique.

Referring now to FIG. 8, another user interface and mockup image overlay technique will be discussed. In the technique, one or more guides are matched (810) to one or more features in a mockup image. The technique can also include displaying (830) a designer interface of a user interface designer module on a computer display. The designer interface can include a user interface representation of the user interface that is under construction, as well as the mockup image representation. The mockup image representation and the user interface representation can be blended in the designer interface. The technique can also include receiving (840) user input directed at the user interface representation from a user input device. In response to the user input, one or more of the features of the user interface that is under construction can be moved (850) toward one or more of the guides. In addition, one or more of the user interface features can be automatically matched (860) to one or more of the guides, such as by snapping.

Figure 9:
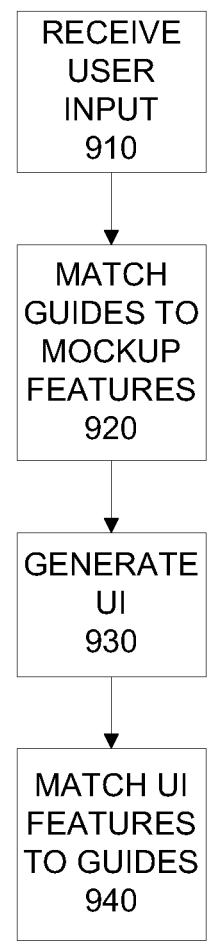
FIG. 9 is a flow diagram of yet another user interface construction technique.

Referring to FIG. 9, yet another user interface representation and mockup image overlay technique will be described. In the technique, user input can be received (910), and one or more guides can be matched (920) to one or more features of a mockup image. In addition, a user interface can be generated (930), such as being generated automatically in response to the user input. In addition, user interface features of a user interface under construction can be matched (940) to the guides. The matching (940) can also be done automatically in response to the user input. In other words, the matching can be done without requiring additional user input that directs the matching.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented method, comprising:
   receiving a mockup image at a user interface designer module;
   overlaying a representation of the mockup image with a representation of a user interface that is under construction in the user interface designer module, the user interface having one or more visual features located away from one or more corresponding visual features of the mockup image; and
   moving one or more locations of the one or more visual features of the user interface to the one or more corresponding visual features of the mockup image, so that the one or more visual features of the user interface are located at the one or more corresponding visual features of the mockup image after the moving of the one or more locations of the one or more visual features of the user interface.

2. The method of claim 1, wherein:
   overlaying comprises displaying on a computer display a designer interface of the user interface designer module, the designer interface comprising:
      the user interface representation, the user interface representation being displayed in a display area; and
      the mockup image representation displayed semi-transparently over the user interface representation in the display area; and
   moving the one or more locations of the one or more visual features of the user interface to the one or more corresponding visual features of the mockup image comprises:
      receiving user input from a user input device, the user input being directed at the display area; and
      modifying the user interface and the user interface representation in response to the user input.

3. The method of claim 2, wherein:
   the user interface is selected from a group consisting essentially of a dialog and a markup language page; and
   the method further comprises passing the user input through the mockup image representation to the user interface representation.

4. The method of claim 2, further comprising passing the user input through the mockup image representation to the user interface representation.

5. The method of claim 1, wherein the user interface is a dialog.

6. The method of claim 1, wherein the user interface comprises a markup language page.

7. The method of claim 6, wherein the markup language page is a hyper text markup language page.

8. The method of claim 1, wherein overlaying comprises blending the user interface representation and the mockup image representation on a computer display, and wherein moving the one or more locations of the one or more visual features of the user interface to the one or more corresponding visual features of the mockup image comprises snapping one or more features of the user interface to one or more features of the mockup image.

9. The method of claim 1, wherein overlaying comprises representing the image and the user interface in a common coordinate system, and moving the one or more locations of the one or more visual features of the user interface to the one or more corresponding visual features of the mockup image comprises automatically moving one or more visual features of the user interface to one or more visual features of the mockup image in the common coordinate system.

10. A computer system comprising:
    at least one processor; and
    a memory comprising instructions stored thereon that when executed by the at least one processor cause the at least one processor to perform acts comprising:
       displaying in a display area a representation of a user interface that is under construction;
       displaying in the display area a representation of a mockup image;
       blending the mockup image representation and the user interface representation so that the mockup image representation and the user interface representation are visible in the display area;
       receiving user input directed at a feature of the user interface representation; and
       modifying a feature of the user interface that corresponds to the feature of the user interface representation in response to receiving the user input, modifying the feature comprising moving the feature of the user interface representation from a position that is out of alignment with a corresponding feature of the mockup image toward a position that is aligned with the corresponding feature of the mockup image.

11. The computer system of claim 10, wherein blending comprises displaying the mockup image representation as a semitransparent image over the user interface representation.

12. The computer system of claim 10, wherein blending comprises displaying the user interface representation as a semitransparent image over the mockup image representation.

13. The computer system of claim 10, wherein the acts further comprise passing the user input through the mockup image representation to the user interface representation.

14. The computer system of claim 10, wherein the acts further comprise modifying the user interface representation in response to the user input.

15. The computer system of claim 10, wherein the feature of the user interface comprises one or more edges of the user interface and modifying the feature of the user interface comprises resizing the user interface.

16. The computer system of claim 10, wherein the user interface is selected from a group consisting essentially of a dialog and a markup language page.

17. One or more computer-readable storage media having computer-executable instructions embodied thereon that, when executed, perform acts comprising:
- matching one or more guides to one or more features in a mockup image; and
- automatically moving one or more features of a user interface that is under construction toward the one or more guides, the moving of the one or more features of the user interface toward the one or more guides moving the one or more features of the user interface toward the one or more features in the mockup image.

18. The one or more computer-readable storage media of claim 17, wherein the acts further comprise:
- displaying on a computer display a designer interface of a user interface designer module, the designer interface comprising:
  - a representation of the user interface that is under construction; and
  - a representation of the mockup image, the mockup image representation being blended with the user interface representation.

19. The one or more computer-readable storage media of claim 18, wherein the acts further comprise:
- receiving user input from a user input device, the user input being directed at the user interface representation; and
- in response to the user input, moving the one or more features of the user interface toward the one or more guides;
- wherein automatically moving the one or more features of the user interface toward the one or more guides comprises snapping the one or more features to the one or more guides.

20. The one or more computer-readable storage media of claim 17, wherein:
- the acts further comprise:
  - receiving user input; and
  - automatically generating the user interface; and
- automatically generating and automatically moving are done in response to the user input.

\* \* \* \* \*